United States Patent [19]

Wang

[11] Patent Number: 5,559,697
[45] Date of Patent: Sep. 24, 1996

[54] METHOD FOR CONTROLLING ACTUATION OF A VEHICLE SAFETY DEVICE

[75] Inventor: Jenne-Tai Wang, Troy, Mich.

[73] Assignee: General Motors Corporation, Detroit, Mich.

[21] Appl. No.: 355,781

[22] Filed: Dec. 14, 1994

[51] Int. Cl.$^6$ .................................................. B60R 21/32
[52] U.S. Cl. .................... 364/424.05; 280/735; 180/282; 307/10.1
[58] Field of Search ....................... 364/424.05; 340/436, 340/438, 669; 307/10.1; 180/274, 282; 280/734, 735

[56] References Cited

U.S. PATENT DOCUMENTS

| | | | |
|---|---|---|---|
| 5,040,118 | 8/1991 | Diller | 364/424.05 |
| 5,081,587 | 1/1992 | Okano | 364/424.05 |
| 5,189,311 | 2/1993 | Moriyama et al. | 180/282 |
| 5,216,607 | 6/1993 | Diller et al. | 364/424.05 |
| 5,262,949 | 11/1993 | Okano et al. | 364/424.05 |
| 5,339,242 | 8/1994 | Reid et al. | 364/424.05 |
| 5,372,411 | 12/1994 | Gerstenmaier et al. | 180/282 |
| 5,396,424 | 3/1995 | Moriyama et al. | 280/734 |

FOREIGN PATENT DOCUMENTS 5-278559  10/1993  Japan.

Primary Examiner—Gary Chin
Attorney, Agent, or Firm—Timothy G. Gorbatoff

[57] ABSTRACT

A method for rapidly distinguishing between severe and minor crash events by utilizing both vehicle deceleration data and vehicle impact velocity. Crash severity parameter values are initially calculated in accordance with vehicle deceleration data obtained from an on-board accelerometer. These values are then modified as a function of the vehicle impact velocity in accordance with a shaping function. Vehicle impact velocity can be obtained from existing vehicle tachometers and speed sensors. The modified crash severity parameter values, when plotted versus time, result in signal traces which form two clearly distinguishable sets—one set being signal traces of severe crash events and the other set being signal traces of minor crash incidents. The two sets of modified crash severity parameter signal traces are distinguishable from one another much earlier than signal traces of unmodified crash severity parameter values. Threshold boundary curves can be lowered and more closely tailored for deployment of an airbag earlier than previously possible, without sacrificing system immunity to minor crash incidents.

8 Claims, 6 Drawing Sheets

METHOD FOR CONTROLLING ACTUATION OF A VEHICLE SAFETY DEVICE

This invention relates to a method for controlling actuation of a vehicle safety device, and more particularly, to a method for providing quicker actuation of a safety device during severe crash events, while maintaining immunity to minor crash incidents.

BACKGROUND OF THE INVENTION

A vehicle crash sensing system detects and discriminates severe crash events which require actuation of a safety device (e.g., deployment of an airbag) such as those listed in Table 1, from minor crash incidents which do not, such as those listed in Table 2.

TABLE 1

| Type of Collision | Speed (km/h) |
| --- | --- |
| Full frontal to barrier | 20–48 |
| 30° angle to barrier | 32–48 |
| On-center pole | 24–48 |
| Full frontal to rear of parked car | 96 |

TABLE 2

| Type of Collision | Speed (km/h) |
| --- | --- |
| Undercarriage Hit | 32 |
| Car-to-Deer | 80 |
| Square Block Road | 64 |
| Chatter Bumps | 96 |
| Hood Slams | N/A |
| Door Slams | N/A |
| Hammer Blows (5–8 lbs.) | N/A |

Discrimination is accomplished by means of a vehicle-mounted accelerometer and an associated signal processing algorithm contained within a microprocessor. Since the total available time for deploying an airbag to effectively restrain occupants in a severe crash event is very short, the ability to quickly and reliably determine the severity of a collision is paramount. Equally important is the system's immunity to inadvertent deployment during minor crash incidents.

Many prior art airbag deployment algorithms have been developed which utilize one or more quantities for measuring the severity of a collision. These "quantities" or "parameters" have included vehicle velocity change, energy, power, power rate, jerk, predicted occupant movement, as well as energy and oscillation measure of the vehicle deceleration signal. The value of these quantities are generally calculated as a function of successively sampled accelerometer data. Based upon test data obtained from the accelerometer during a representative set of minor crash incidents, one or more boundary thresholds are set. Airbag deployment is initiated whenever the values of some or all of these quantities exceed their respective boundary threshold levels.

A major problem in quickly discriminating the severity of a collision is the relatively soft initial impact of some severe crash events which is similar to that of minor crash incidents. For example, referring to FIG. 1, a 30 mph (48 km/h) center pole impact 10 (characterized as a severe crash event necessitating deployment of an airbag) has a similar velocity change signal trace as a 9 mph (14 km/h) frontal barrier impact 12 (characterized as a minor crash incident). Not until after 58 msec into the crash (point 13) are the severity of the two events distinguishable. A second example is depicted in FIG. 2 in which the vehicle velocity change signal trace of a 48 km/h, 30° angle impact 14 (characterized as a severe crash event) is very similar to that of an 80 km/h simulated deer hit 16 (characterized as a minor crash incident). In this case, absolute discrimination is not possible until 25 msec into the crash (point 17). Any attempts to distinguish between the severity of the two crash events of FIGS. 1 and 2 prior to the last point of intersection (13 and 17) of their respective signal traces will compromise the system immunity to deployment during minor crash incidents.

In view of the foregoing, there is a desire to develop a method for reducing the time required for distinguishing the severity of a crash event for controlling actuation of a vehicle safety device, without compromising system immunity to minor crash incidents.

SUMMARY OF THE INVENTION

The present invention is directed to a method for rapidly distinguishing between severe and minor crash events by utilizing both vehicle deceleration data and vehicle impact velocity. According to the present invention, crash severity parameter values are initially calculated in accordance with vehicle deceleration data obtained from an on-board accelerometer. These values are then modified as a function of the vehicle impact velocity in accordance with a shaping function. Vehicle impact velocity can be obtained from existing vehicle tachometers and speed sensors.

The modified crash severity parameter values, when plotted versus time, result in signal traces which form two clearly distinguishable sets—one set being signal traces of severe crash events and the other set being signal traces of minor crash incidents. The two sets of modified crash severity parameter signal traces are distinguishable from one another much earlier than signal traces of unmodified crash severity parameter values. That is, their last point of intersection occurs much sooner after the onset of an impact. For this reason, threshold boundary curves can be lowered and more closely tailored for deployment of an airbag earlier than previously possible, without sacrificing system immunity to minor crash incidents.

These and other aspects and advantages of the invention may be best understood by reference to the following detailed description of the preferred embodiments when considered in conjunction with the accompanying drawings.

DETAILED DESCRIPTION OF THE PREFERRED EMBODIMENTS

In the description that follows, similar methodologies and signal traces used in multiple figures will be designated with like numerals, and where such methodologies and signal traces have been previously discussed with respect to an earlier figure, the description will not be repeated.

Figure 1:
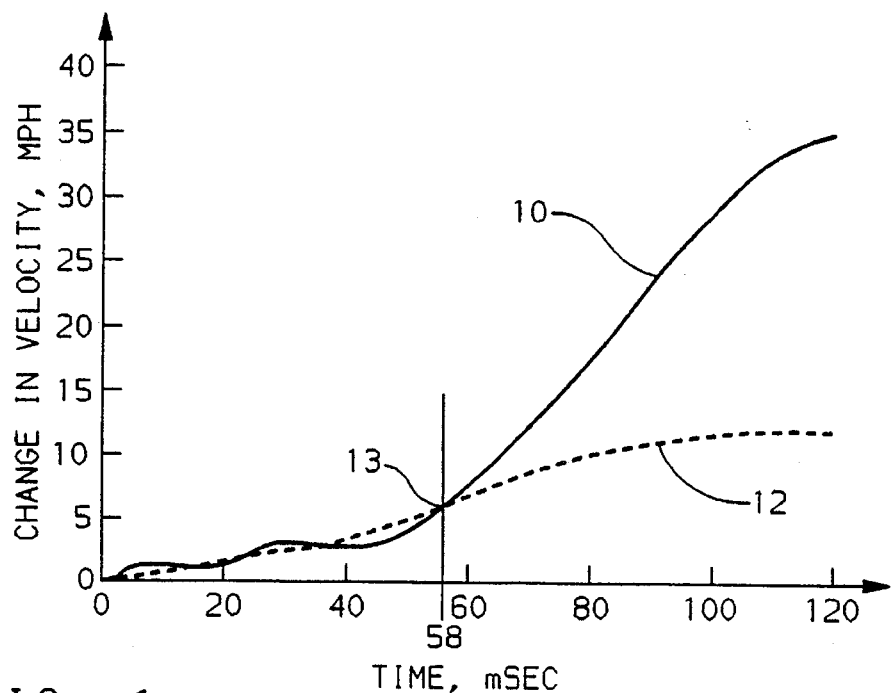
FIG. 1 illustrates a graph of vehicle velocity changes versus time for a 30 mph pole impact and a 9 mph frontal barrier impact.
Figure 2:
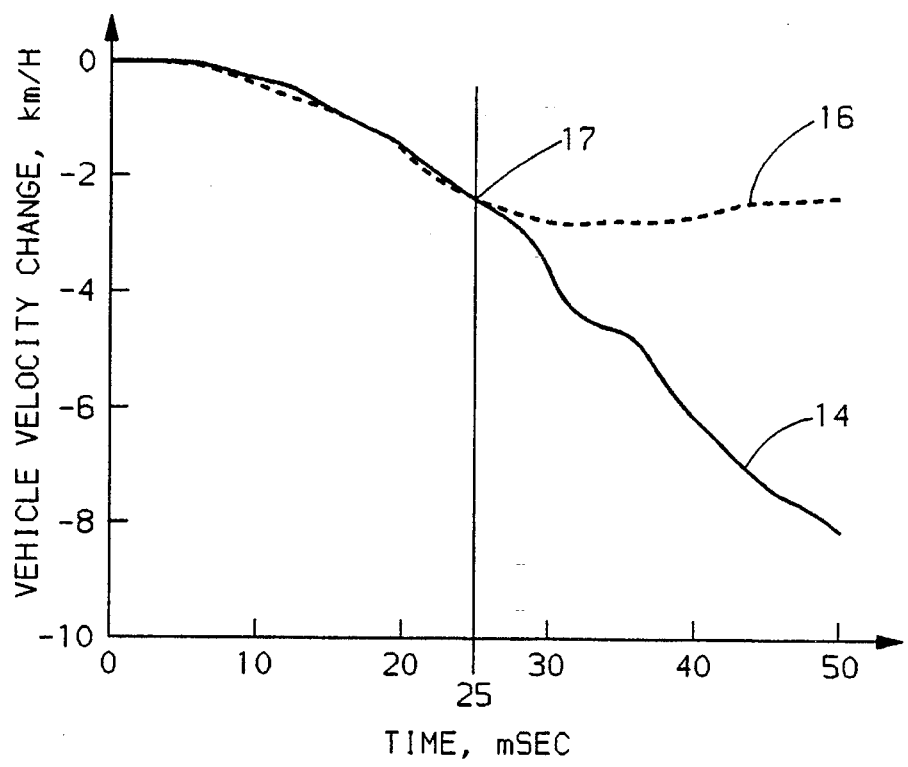
FIG. 2 illustrates a graph of vehicle velocity changes versus time for a 48 km/h, 30° angle impact and an 80 km/h simulated deer hit.
Figure 3:
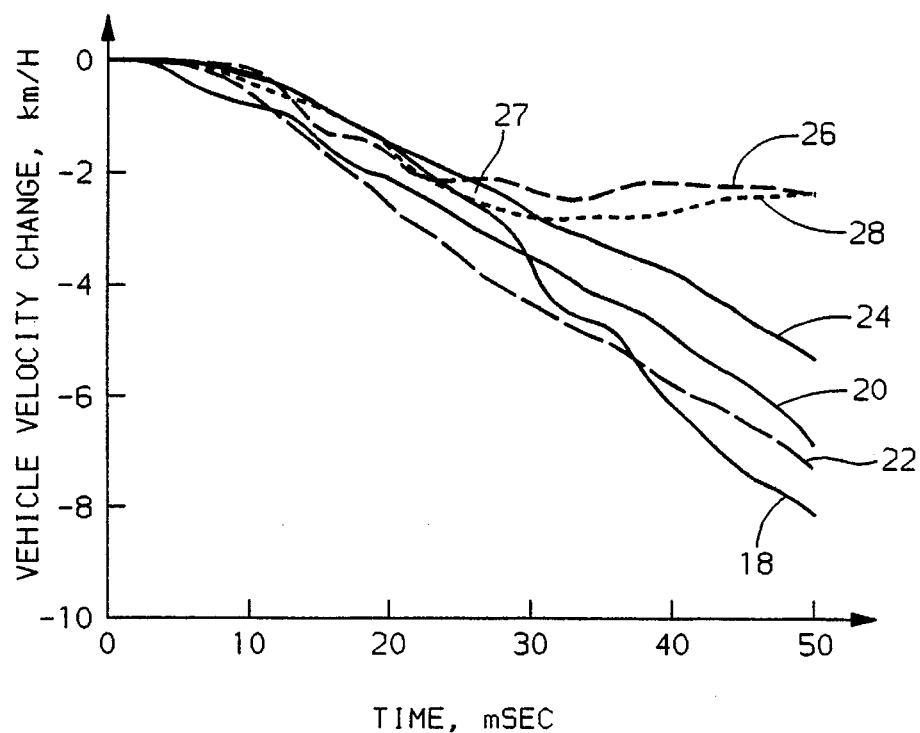
FIG. 3 illustrates a graph of unmodified vehicle velocity changes versus time for various types of severe and minor crash events.

Referring to the drawings, and more particularly to FIG. 3, there is illustrated a graph of vehicle velocity change signal traces for six types of collisions. Of the six collisions, three are identified as severe crash events while the remaining three are identified as minor crash incidents. The three severe crash events include a 48 km/h center pole impact 18, a 48 km/h angle impact 20 and a 19 km/h frontal barrier impact 22. The three minor crash incidents include a 14 km/h frontal barrier impact 24, a 32 km/h undercarriage hit 26 and an 80 km/h simulated deer hit 28.

Distinguishing between these two sets of collisions is achieved by establishing boundary threshold levels. Values of the signal traces which exceed the boundary threshold levels correspond to severe crash events requiring deployment of a vehicle safety device. Referring to FIG. 3, the two types of collisions are not distinguishable until 25 msec. after the onset of a detected impact, which corresponds to the last point of intersection 27 between the signal traces of the severe and minor crash events. Any attempts to detect severe crash events sooner (i.e., by lowering the threshold boundary levels) will sacrifice system immunity to minor crash incidents.

Figure 4:
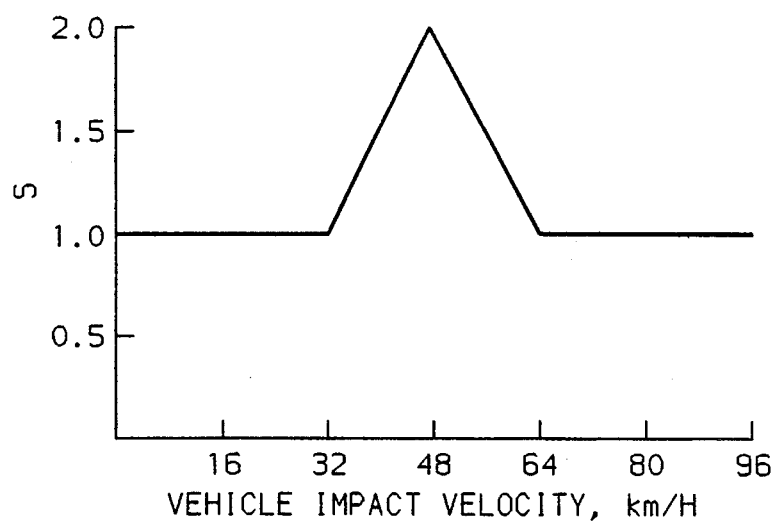
FIG. 4 illustrates a shaping function according to the present invention for modifying the signal traces of FIG. 3.

In this regard, the present invention modifies crash severity parameter signal traces, such as those illustrated in FIG. 3, as a function of vehicle impact velocity in accordance with a shaping function. The shaping function $S(V_i)$ of the preferred embodiment is illustrated in FIG. 4 and can be expressed as follows:

$$
\begin{aligned}
S(V_i) &= 1, & \text{if } V_i \leq 32 \text{ km/h} \\
&= V_i/16 - 1, & \text{if } 32 \text{ km/h} < V_i \leq 48 \text{ km/h} \\
&= 5 - V_i/16, & \text{if } 48 \text{ km/h} < V_i \leq 64 \text{ km/h} \\
&= 1, & \text{if } 64 \text{ km/h} < V_i
\end{aligned}
\quad (1)
$$

where $V_i$ is the vehicle impact velocity, defined as one-half the relative velocity between two colliding vehicles or the approaching velocity of a vehicle to a fixed object, such as a pole or barrier. Vehicle impact velocity can be accurately obtained from on-board radar and vision systems as part of, for example, a crash avoidance system. However, for vehicles not so equipped, vehicle impact velocity can be approximated by existing vehicle speed sensors.

The particular "shape" of the shape function can vary (e.g., inverted "V", trapezoid, convex curve, etc.). The choice of shape, as well as its scale factor S, is a design variable for engineers to fine tune during the design of a particular vehicle, to meet the requirements of the specific application.

The vehicle velocity change curves, illustrated in FIG. 3, can now be modified using the shaping function defined by equation (1) as follows:

$$\Delta V_m = S(V_i) * \Delta V \quad (2)$$

where $\Delta V_m$ is the modified vehicle velocity change value, and $\Delta V$ is the vehicle velocity change value which is directly calculated using the measured vehicle deceleration, a(t), and defined as:

$$\Delta V = \int a(t) dt \quad (3)$$

Figure 5:
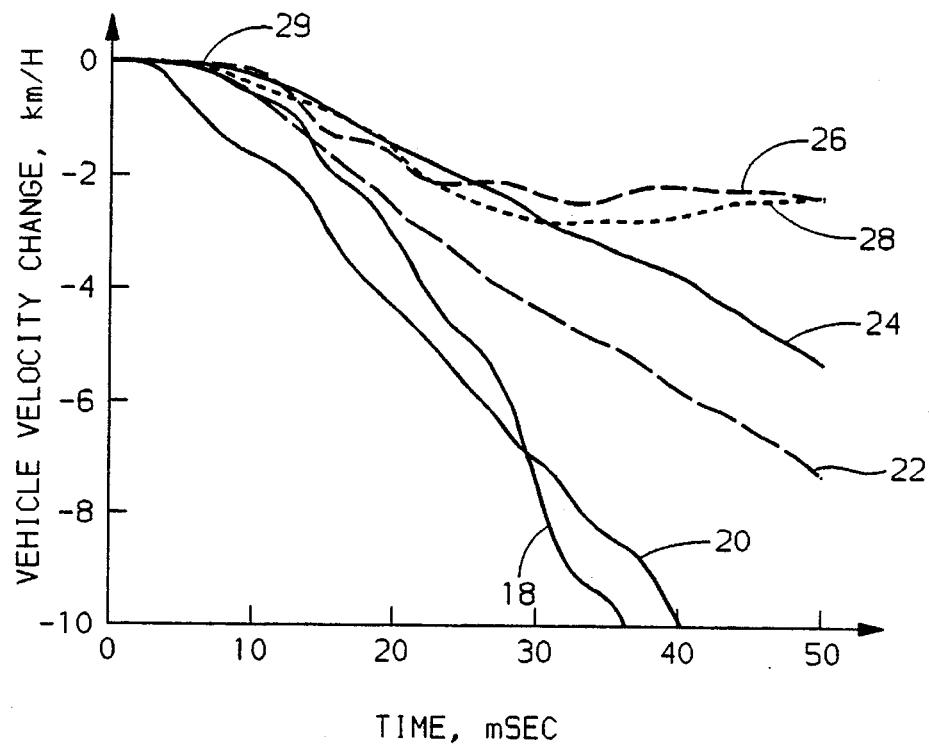
FIG. 5 illustrates a graph of modified vehicle velocity changes versus time of the severe and minor crash events illustrated in FIG. 3.

FIG. 5 illustrates the modified vehicle velocity change curves. Unlike the curves depicted in FIG. 3, FIG. 5 clearly shows that the modified vehicle velocity change curves of the three severe crash events 18, 20 and 22 are distinctly different and identifiable from the three minor crash incidents 24, 26 and 28. In this regard, the two sets of collisions are distinguishable much earlier using the modified velocity change curves than with the unmodified curves. Notice that the last point of intersection 29 between the two sets of collisions of FIG. 5 is at 5 msec, rather than 25 msec in FIG. 3.

Figure 6:
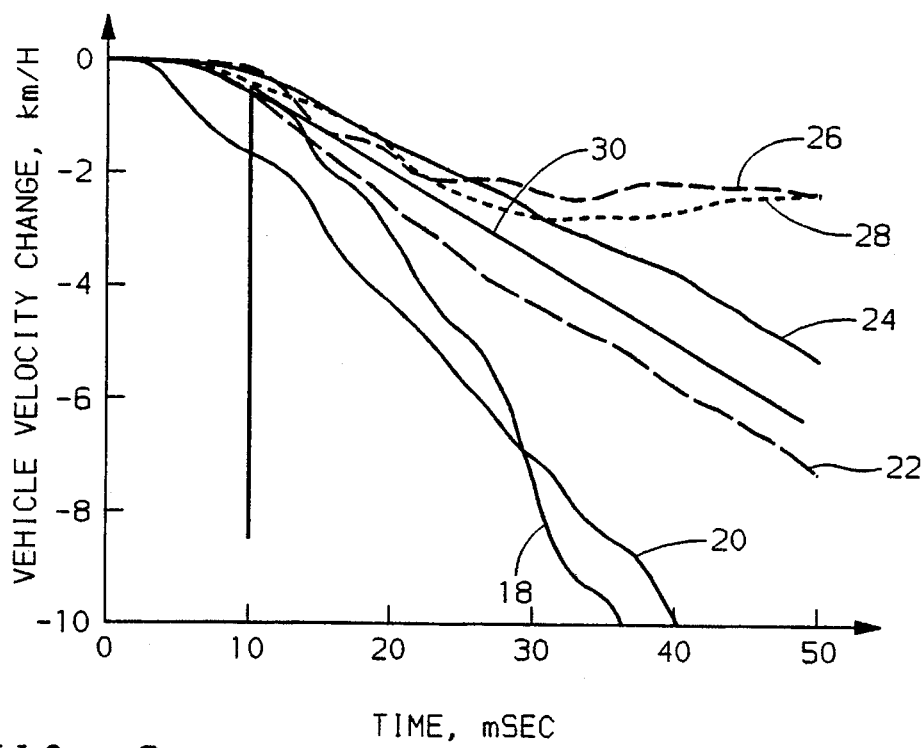
FIG. 6 is a reillustration of FIG. 5 with a first velocity boundary curve for distinguishing between severe and minor crash events.
Figure 7:
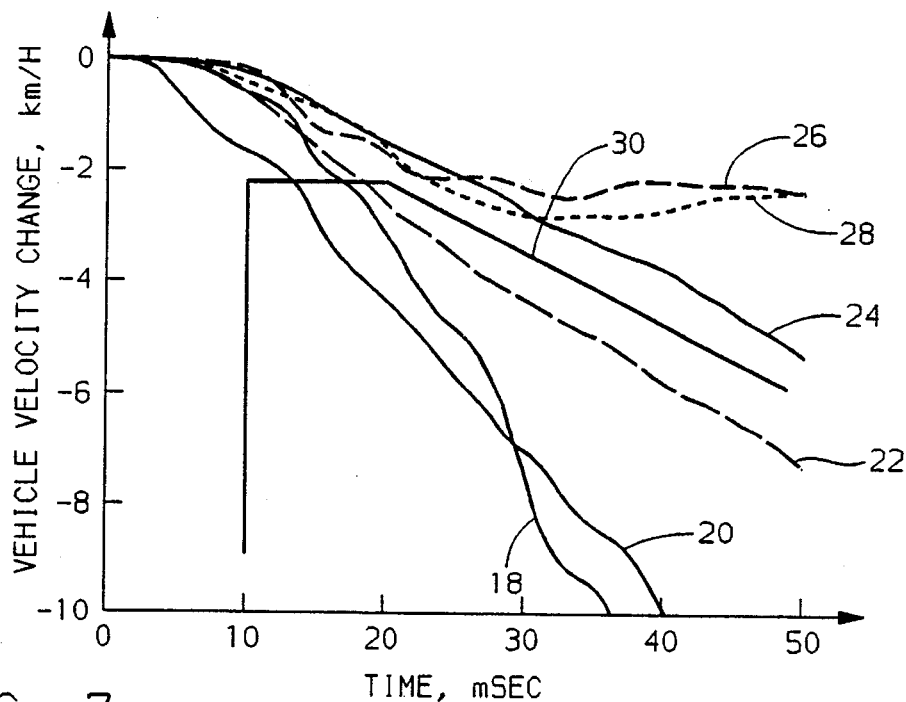
FIG. 7 is a reillustration of FIG. 5 with a second velocity boundary curve for distinguishing between severe and minor crash events.

As noted earlier, detection of a severe crash event is achieved by comparing the value of the crash severity parameter to a predetermined boundary threshold level. FIGS. 6 and 7 illustrate two possible modified velocity boundary curves 30 which can be established for the modified velocity change curves of FIG. 5. Referring to FIGS. 6 and 7, the detection time for a 48 km/h, 30° angle barrier impact 18 will be at 10 and 17 msec, respectively, which is 8 to 15 msec earlier than the earliest possible discrimination time of 25 msec, identified for the unmodified velocity change curves of FIG. 3.

Figure 8:
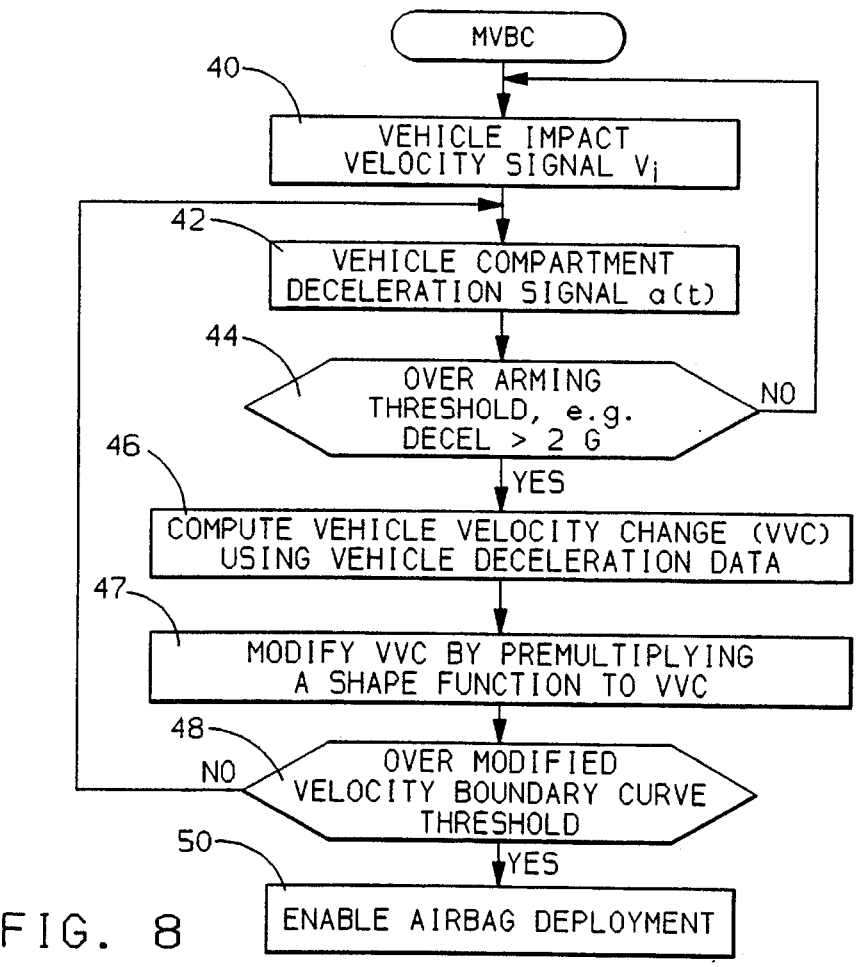
FIG. 8 is a flow chart of computer instructions executed by a microprocessor for carrying out the method of the present invention.

The method of the present invention may be referred to as the Modified Velocity Boundary Curve method (MVBC). A specific flow chart depicting the computer instructions executed by the microprocessor in carrying out the MVBC method is illustrated in FIG. 8. Referring to FIG. 8, vehicle velocity, $V_i$, and deceleration data, a(t), are initially sampled at steps 40 and 42, respectively. A COMPARE function at step 44 compares the vehicle deceleration value with a threshold deceleration value. If the vehicle deceleration value exceeds the threshold deceleration value, a vehicle impact is assumed to have occurred and processing continues to determine the severity of the impact and the necessity of actuation of the safety device.

If an impact has not occurred, the microprocessor resamples the vehicle velocity and deceleration data in steps 40 and 42. If an impact has occurred, the microprocessor continues at step 46 by calculating a crash severity parameter, such as vehicle velocity change ($\Delta V$), energy, jerk, power rate, oscillation measure, etc. This parameter value is then modified at step 47 in accordance with the shaping function $S(V_i)$. The microprocessor next compares the modified parameter value, $\Delta V_m$, with a predetermined time-dependent deployment threshold value at step 48 for the appropriate time period into the crash event. If the value of the modified crash severity parameter is greater than the threshold value, the microprocessor enables airbag deployment at step 50. Otherwise, it resamples the deceleration data at step 42 and repeats. Since the vehicle impact velocity $V_i$ is the vehicle velocity at the moment of impact, it is not resampled.

Figure 9:
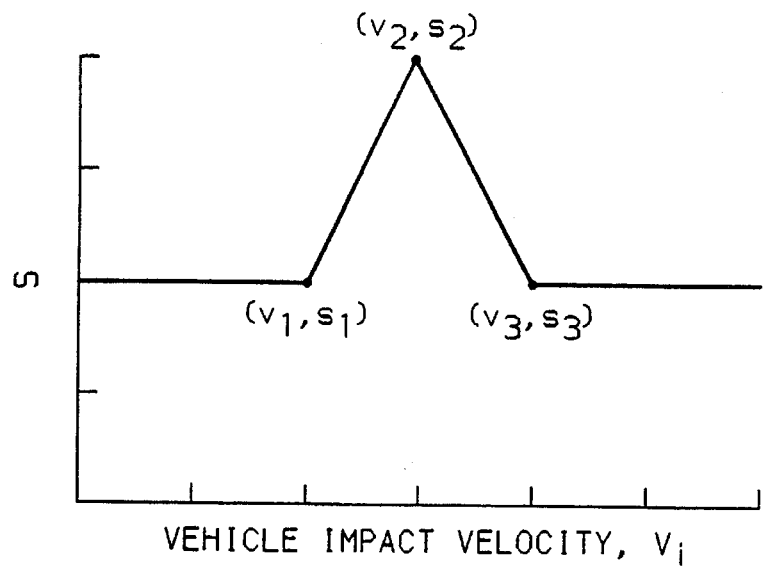
FIG. 9 is a generalized, inverted "V" shaped shaping function in accordance with the present invention.

The shaping function plays a central role in the present invention. A generalized, inverted "V" shaping function is illustrated in FIG. 9, and is characterized by the following formula:

$$S(V_i) = s_1, \quad \text{if } V_i \leq v_1 \qquad (4)$$
$$= a_1 V_i + b_1, \quad \text{if } v_1 < V_i \leq v_2$$
$$= a_2 V_i + b_2, \quad \text{if } v_2 < V_i \leq v_3$$
$$= s_3, \quad \text{if } v_3 < V_i$$

where
$a_1 = (s_2 - s_1)/(v_2 - v_1)$
$b_1 = s_1 - [(s_2 - s_1)/(v_2 - v_1)] * v_1$
$a_2 = (s_3 - s_2)/(v_3 - v_2)$
$b_2 = s_3 - [(s_3 - s_2)/(v_3 - v_2)] * v_2$ and where $v_1$, $v_2$, $v_3$, $s_1$, $s_2$ and $s_3$ are defined in FIG. 9 and their values can be set to meet the needs of each specific vehicle design application. The shaping function of FIG. 3 is a specific case of the generalized shaping function of FIG. 9.

Referring to FIG. 3, the scale factor, S, value of "1" assigned to those impact velocities either less than 32 km/h or greater than 64 km/h serves two purposes: (i) it maintains the same non-deployment threshold for both low speed and high speed crash events as in the unmodified case to, maintaining immunity to minor crash incidents, and (ii) it provides some unmodified margin for the crash events which an impact velocity near that of the non-deployment threshold events, which improves the robustness of the algorithm.

The linearly increasing value of S(Vi) for crash events with an impact velocity ranging from 32 km/h to 48 km/h elevates and amplifies the magnitude of the crash events near the main deployment events to help detection of severe crash events. The linearly decreasing value of S(Vi) for the crash events with an impact velocity ranging from 48 km/h to 64 km/h serves a similar purpose as the linearly increasing portion, as well as reduces the possible side effects from over-reaching to high speed impact events.

Notice that, in accordance with the shape of the shaping function, the severity of a crash event is not necessarily dependent upon the velocity of the vehicle at impact.

While the preferred embodiment was described in reference to modifying vehicle velocity change, it is applicable to any crash severity parameter. For example, equation (2) can be revised to incorporate the energy of the impact, E, and the oscillation measure, OM, of the deceleration signal as disclosed in U.S. Pat. No. 5,339,242 to Reid et. al. Accordingly, the modified vehicle energy, $E_m$, could be in the form of:

$$E_m = S(V_i) * E \qquad (5)$$

while the modified oscillation measure, $OM_m$, could be in the form of:

$$OM_m = S(V_i) * \int |da(t)/dt| dt \qquad (6)$$

With these values, one could establish a set of modified energy and oscillation boundary curves, respectively. These curves could be used to provide for more rapid discrimination between severe and minor crash events than previously possible.

As noted above, vehicle impact velocity ($V_i$) is defined as one-half the relative velocity between two colliding vehicles, or the approaching velocity of a vehicle to a fixed object, such as a pole or barrier. Vehicle impact velocity is, therefore, not necessarily equal to the running velocity of the vehicle. That is, the velocity of the vehicle as indicated by the vehicle speedometer. For vehicles not equipped with on-board radar and vision systems, vehicle running speed sensors typically located on the output shaft of the transmission must be relied upon. When a vehicle is travelling on a road with a low surface friction coefficient or is airborne due to an abrupt change in driving surface, a free spinning or locked wheel condition may occur. In this case, the vehicle running speed information may be erroneous, that is, not accurately depict the approaching velocity of the vehicle.

Figure 10:
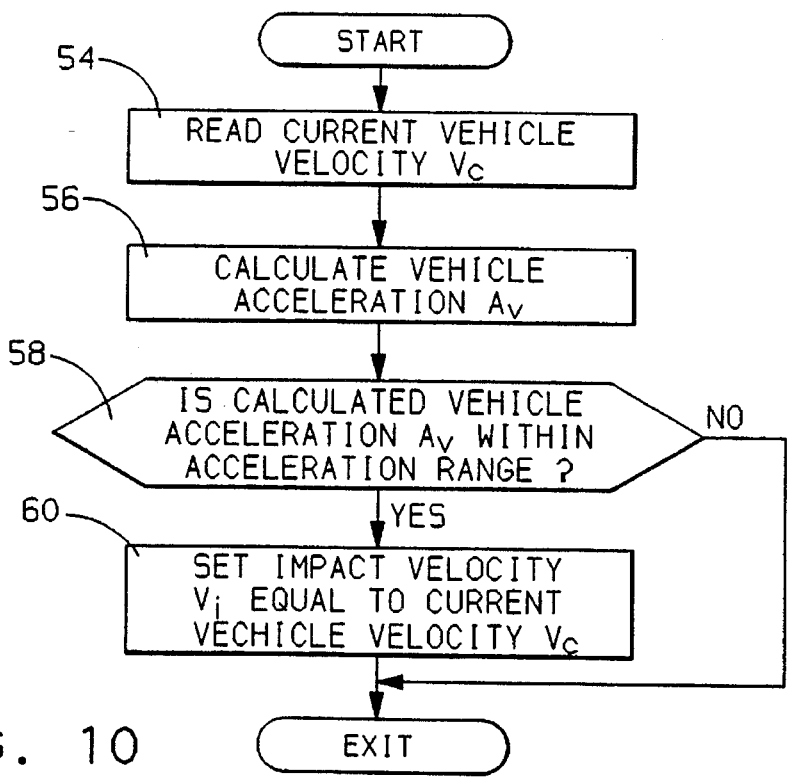
FIG. 10 is a flow chart of computer instructions executed by a microprocessor for determining vehicle impact velocity.

Accordingly, FIG. 10 illustrates a method for determining impact velocity from a vehicle running speed sensor. It is intended to enhance the accuracy of the method of the present invention illustrated in FIG. 8, by replacing step 40. Referring to FIG. 10, the method begins at step 54 by reading the current vehicle velocity ($V_c$) from the vehicle running speed sensor. At step 56, vehicle acceleration ($A_v$) is calculated as a function of the vehicle velocity readings of step 54. In step 58, the calculated vehicle acceleration $A_v$ is compared to an acceleration range. The range will generally span between −1 g (g=gravitational force) and +1 g. The maximum normal vehicle acceleration/deceleration is limited to a magnitude of 1 g. A value exceeding this magnitude corresponds to an erroneous running speed.

If the calculated vehicle acceleration is within the acceptable range of values, as determined by step 58, the running speed of the vehicle is deemed to be accurate and step 60 sets the vehicle impact velocity $V_i$ equal to the current vehicle running speed. If, however, the calculated vehicle acceleration of step 56 is not within the acceptable range of values in step 58, the running speed of the vehicle is deemed to be erroneous and the impact velocity is not updated. That is, its value remains the same, equal to the last value of impact velocity determined in step 60.

If the running speed of the vehicle is determined by step 58 to be erroneous, the vehicle wheels are assumed to be free spinning or locked. In either case, provisions can be made for a time delay (e.g., 2 sec.) to delay rereading the current vehicle velocity in step 54 prior to the vehicle wheels regaining proper rotation.

An additional problem associated with using running speed of a vehicle for controlling deployment of an airbag is in distinguishing between the severity of front-to-rear collisions. For example, consider the case of a 30 mph vehicle hitting the rear of a 15 mph vehicle. The running speed of the striking vehicle is 30 mph while the impact velocity is only 7.5 mph [(30−15)/2], which qualifies as a minor crash event. Accordingly, FIG. 11 illustrates an alternative embodiment of the method of FIG. 8, incorporating provisions for discriminating the severity of front-to-rear collisions.

Figure 11:
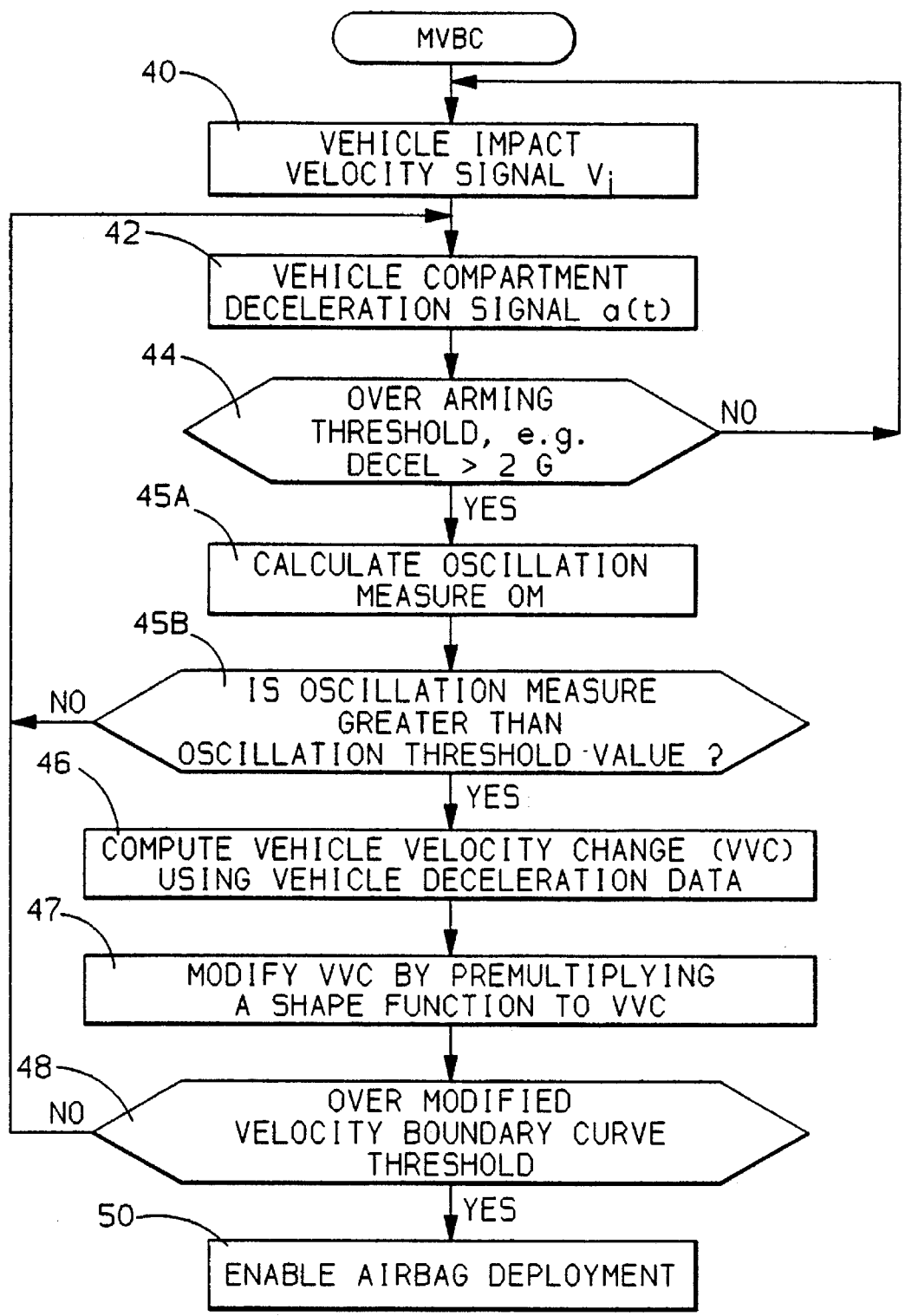
FIG. 11 is an alternative embodiment of the method of FIG. 8, incorporating provisions for discriminating between the severity of front-to-rear collisions.

Referring to FIG. 11, steps 45A and 45B have been added. Step 45A adds the computation of an additional crash severity parameter known as the oscillation measure OM of the vehicle deceleration signal read in step 42, generally defined as:

$$OM = \int |da(t)/dt| dt \qquad (7)$$

and disclosed in U.S. Pat. No. 5,339,242 to Reid et al. The oscillation measure reflects the oscillation content of the vehicle deceleration signal data. Low impact velocity front-to-rear collisions result in much lower oscillation measure values than their higher impact counterparts. Accordingly, the oscillation measure value $O_m$ of step 45A is compared to an oscillation measure boundary curve in step 45B having time-dependent threshold values, with all values greater than the corresponding threshold value indicative of a high impact front-to-rear collision requiring further discrimination for possible airbag deployment. An oscillation measure less than the corresponding threshold value can be indicative of a low impact "non-deployment" type front-to-rear collision.

While the present invention has been described in reference to the illustrated embodiments, it will be recognized that various modifications will occur to those skilled in the art. In this regard, it will be understood that methods incorporating such modifications may fall within the scope of this invention, which is defined by the appended claims.

The embodiments of this invention in which an exclusive property or privilege is claimed are defined as follows:

1. A method for controlling actuation of a vehicle safety device, comprising the steps of:

sampling vehicle velocity to obtain discrete values of velocity;

sampling vehicle deceleration to obtain discrete values of deceleration;

comparing the discrete values of deceleration with a deceleration threshold value to detect the onset of a crash event, a discrete value of deceleration greater than the deceleration threshold value corresponding to a crash event;

calculating, upon the onset of the detected crash event, crash severity parameter values as a function of the discrete values of deceleration;

modifying the crash severity parameter values as a function of the discrete value of velocity obtained at the onset of the detected crash event;

comparing the modified crash severity parameter values with time-dependent parameter threshold values, a value of the modified crash severity parameter greater than the parameter threshold value for the corresponding time into the crash event being indicative of a severe crash event; and actuating the vehicle safety device when the severe crash event has been indicated.

2. The method for controlling actuation of a vehicle safety device according to claim 1, wherein the step of modifying the crash severity parameter values as a function of the discrete value of velocity obtained at the onset of the detected crash event comprises the steps of:

identifying a scale factor (i) in accordance with a predetermined shaping function, and (ii) as a function of the value of the discrete value of velocity obtained at the onset of the detected crash event; and multiplying the crash severity parameter values by the scale factor.

3. The method for controlling actuation of a vehicle safety device according to claim 2, wherein the shaping function has a magnitude which varies as a function of vehicle velocity such that the identified scale factor is the magnitude of the shaping function corresponding to the discrete value of velocity obtained at the onset of the detected crash event.

4. The method for controlling actuation of a vehicle safety device according to claim 1, wherein the crash severity parameter is one of vehicle velocity change, energy, power, power rate, jerk, predicted occupant movement, energy of the vehicle deceleration signal, and oscillation of the vehicle deceleration signal, each calculated as a function of discrete values of deceleration.

5. The method for controlling actuation of a vehicle safety device according to claim 1, wherein the vehicle velocity is sampled from one of (i) an on-board speed sensor corresponding to the running speed of the vehicle, (ii) an on-board radar system corresponding to one-half the relative velocity of the vehicle to a moving object, and (iii) an on-board radar system corresponding to the approaching velocity of the vehicle to a fixed object.

6. The method for controlling actuation of a vehicle safety device according to claim 1, further comprising:

calculating, upon the onset of the detected crash event, an oscillation measure value corresponding to an oscillation content of the vehicle deceleration; and comparing the oscillation measure value with a time-dependent oscillation threshold value, a value of the oscillation measure value less than the oscillation threshold value corresponding to a minor crash event not requiring actuation of the vehicle safety device.

7. The method for controlling actuation of a vehicle safety device according to claim 1, wherein the step of obtaining the discrete values of velocity comprises:

calculating a discrete value of vehicle acceleration as a function of the sampled vehicle velocity;

comparing the discrete value of vehicle acceleration to a predetermined range of acceleration values; and equating vehicle velocity to the sampled vehicle velocity if the discrete value of vehicle acceleration is within the predetermined range of acceleration values, the current value of vehicle velocity remaining the same if the discrete value of vehicle acceleration is not within the predetermined range of acceleration values.

8. A method for controlling actuation of a vehicle safety device, comprising the steps of:

sampling vehicle velocity to obtain discrete values of velocity;

sampling vehicle deceleration to obtain discrete values of deceleration;

comparing the discrete values of deceleration with a deceleration threshold value to detect the onset of a crash event, a discrete value of deceleration greater than the deceleration threshold value corresponding to a crash event;

calculating, upon the onset of the detected crash event, the values of at least two crash severity parameters as a function of the discrete values of deceleration;

modifying the values of the crash severity parameters as a function of the discrete value of velocity obtained at the onset of the detected crash event;

comparing the modified values of each of the crash severity parameters with respective time-dependent parameter threshold values, modified values of the crash severity parameters simultaneously greater than their respective parameter threshold values for the corresponding time into the crash event being indicative of a severe crash event; and actuating the vehicle safety device when the severe crash event has been indicated.

* * * * *